US009045369B2

(12) United States Patent
Baker (10) Patent No.: US 9,045,369 B2
(45) Date of Patent: Jun. 2, 2015

(54) COMPOSITE MATERIALS, ARTICLES OF MANUFACTURE PRODUCED THEREFROM, AND METHODS FOR THEIR MANUFACTURE

(75) Inventor: Charles Baker, Lenexa, KS (US)

(73) Assignee: Elk Composite Building Products, Inc., Dallas, TX (US)

( * ) Notice: Subject to any disclaimer, the term of this patent is extended or adjusted under 35 U.S.C. 154(b) by 3196 days.

(21) Appl. No.: 10/260,107

(22) Filed: Sep. 27, 2002

(65) Prior Publication Data
US 2003/0082338 A1 May 1, 2003

Related U.S. Application Data

(63) Continuation-in-part of application No. 09/706,590, filed on Nov. 6, 2000, now Pat. No. 6,881,367.

(51) Int. Cl.
| | | |
|---|---|---|
| B32B 5/00 | (2006.01) | |
| C04B 26/04 | (2006.01) | |
| B32B 5/28 | (2006.01) | |
| C08J 5/04 | (2006.01) | |
| C08L 97/02 | (2006.01) | |
| B29C 47/00 | (2006.01) | |
| B29C 47/02 | (2006.01) | |
| B29C 47/28 | (2006.01) | |

(Continued)

(52) U.S. Cl.
CPC ............ *C04B 26/045* (2013.01); *Y10T 428/24* (2015.01); *Y10T 428/24132* (2015.01); *B29C 47/0004* (2013.01); *B29C 47/0019* (2013.01); *B29C 47/0028* (2013.01); *B29C 47/0038* (2013.01); *B29C 47/02* (2013.01); *B29C 47/28* (2013.01); *B29K 2105/06* (2013.01); *B32B 5/28* (2013.01); *C04B 2111/00129* (2013.01); *C04B 2111/00629* (2013.01); *C08J 5/043* (2013.01); *C08J 5/045* (2013.01); *C08J 2323/02* (2013.01); *C08L 97/02* (2013.01); *B29C 47/0066* (2013.01); *B29C 47/04* (2013.01); *B29C 47/043* (2013.01)

(58) Field of Classification Search
CPC .. B29C 47/04; B29C 47/043; B29C 47/0004; B29K 2105/06; B32B 5/28; C08J 5/043
See application file for complete search history.

(56) References Cited

U.S. PATENT DOCUMENTS

| 3,861,674 A | * | 1/1975 | Buck, Jr. .......................... 482/30 |
| 4,323,625 A | * | 4/1982 | Coran et al. ................... 428/361 |

(Continued)

OTHER PUBLICATIONS

Polymer Science Learning Center, Department of Polymer Science, University of Southern Mississippi, http://pslc.ws/mactest/crystal.htm; downloaded from the internet Jan. 29, 2009.*

*Primary Examiner* — Jennifer Chriss
*Assistant Examiner* — Camie Thompson
(74) *Attorney, Agent, or Firm* — Baker Botts, LLP (57) ABSTRACT

The invention is directed to a plastic fiber article of manufacture having composite-like high strength characteristics. The article of manufacture can be in the form of a panel or board. The panel or board is constructed from low cost fiber materials, industrial grade or high thermoplastic, and other additives to protect the board or panel from ultraviolet light, fugii growth, excessive heat, fire, insect infestation, and/or weathering. The plastic fiber panel or board may be textured and colored to resemble natural wood such as cedar, walnut, or oak. The plastic fiber panel or board is stronger more durable and may be cheaper than natural wood alternative panels or boards.

37 Claims, 4 Drawing Sheets

(51) Int. Cl.
*B29K 105/06* (2006.01)
*C04B 111/00* (2006.01)
*B29C 47/04* (2006.01)

(56) References Cited

U.S. PATENT DOCUMENTS

| | | | |
|---|---|---|---|
| 4,791,020 A | 12/1988 | Kokta | 428/326 |
| 5,075,057 A | 12/1991 | Hoedl | 264/115 |
| 5,082,605 A | 1/1992 | Brooks et al. | 264/40.6 |
| 5,088,910 A | 2/1992 | Goforth et al. | 425/142 |
| 5,194,461 A | 3/1993 | Bergquist et al. | 524/13 |
| 5,315,808 A * | 5/1994 | MacIvor et al. | 53/399 |
| 5,406,768 A | 4/1995 | Giuseppe et al. | 52/730.4 |
| 5,435,954 A | 7/1995 | Wold | 264/115 |
| 5,441,801 A | 8/1995 | Deaner et al. | 428/326 |
| 5,474,722 A | 12/1995 | Woodhams | 264/45.3 |
| 5,480,602 A | 1/1996 | Nagaich | 264/122 |
| 5,486,553 A | 1/1996 | Deaner et al. | 524/13 |
| 5,497,594 A | 3/1996 | Giuseppe et al. | 52/730.4 |
| 5,498,469 A | 3/1996 | Howard et al. | 428/218 |
| 5,516,472 A | 5/1996 | Laver | 264/118 |
| 5,518,677 A | 5/1996 | Deaner et al. | 264/142 |
| 5,539,027 A | 7/1996 | Deaner et al. | 524/13 |
| 5,585,155 A | 12/1996 | Heikkila et al. | 428/36.7 |
| 5,656,129 A | 8/1997 | Good et al. | 162/13 |
| 5,660,016 A | 8/1997 | Erwin et al. | 52/483.1 |
| 5,695,874 A | 12/1997 | Deaner et al. | 428/326 |
| 5,746,958 A | 5/1998 | Gustafsson et al. | 264/115 |
| 5,773,138 A | 6/1998 | Seethamraju et al. | 428/326 |
| 5,795,940 A * | 8/1998 | Pearce et al. | 525/222 |
| 5,827,462 A | 10/1998 | Brandt et al. | 264/179 |
| 5,827,607 A | 10/1998 | Deaner et al. | 428/326 |
| D402,770 S | 12/1998 | Hendrickson et al. | D25/141 |
| 5,851,469 A | 12/1998 | Muller et al. | 264/177.1 |
| 5,882,524 A | 3/1999 | Storey et al. | 210/712 |
| 5,902,657 A | 5/1999 | Hanson et al. | 428/36.92 |
| 5,932,038 A | 8/1999 | Bach et al. | 156/62.2 |
| 5,932,334 A | 8/1999 | Deaner et al. | 428/292.4 |
| 5,948,505 A | 9/1999 | Puppin | 428/121 |
| 5,948,524 A | 9/1999 | Seethamraju et al. | 428/326 |
| 5,953,878 A | 9/1999 | Johnson | 52/582.2 |
| 5,973,035 A | 10/1999 | Medoff et al. | 524/13 |
| 5,981,067 A | 11/1999 | Seethamraju et al. | 428/393 |
| 5,985,429 A | 11/1999 | Plummer et al. | 428/220 |
| 6,004,668 A | 12/1999 | Deaner et al. | 428/326 |
| 6,007,656 A | 12/1999 | Heikkila et al. | 156/180 |
| 6,015,611 A | 1/2000 | Deaner et al. | 428/326 |
| 6,015,612 A | 1/2000 | Deaner et al. | 428/326 |
| 6,054,207 A | 4/2000 | Finley | 428/317.9 |
| 6,103,035 A | 8/2000 | Hanson et al. | 156/73.5 |
| 6,106,944 A | 8/2000 | Heikkila et al. | 428/397 |
| 6,122,877 A | 9/2000 | Hendrickson et al. | 52/520 |
| 6,153,293 A | 11/2000 | Dahl et al. | 428/310.5 |
| 6,180,257 B1 | 1/2001 | Brandt et al. | 428/532 |
| 6,207,729 B1 | 3/2001 | Medoff et al. | 523/129 |
| 6,210,792 B1 | 4/2001 | Seethamraju et al. | 428/326 |
| 6,258,876 B1 | 7/2001 | Medoff et al. | 524/13 |
| 6,265,037 B1 | 7/2001 | Godavarti et al. | 428/34 |
| 6,280,667 B1 | 8/2001 | Koenig et al. | 264/68 |
| 6,312,639 B1 | 11/2001 | Ertle et al. | 264/349 |
| 6,342,172 B1 | 1/2002 | Finley | 264/45.3 |
| 6,344,268 B1 | 2/2002 | Stucky et al. | 428/317.9 |
| 6,344,504 B1 | 2/2002 | Zehner et al. | 524/14 |
| 6,346,160 B1 | 2/2002 | Puppin | 156/88 |
| 6,357,197 B1 | 3/2002 | Serino et al. | 52/738.1 |
| 6,358,614 B1 * | 3/2002 | Porter | 428/447 |
| 2002/0092207 A1 * | 7/2002 | Girard et al. | 36/117.3 |

* cited by examiner

COMPOSITE MATERIALS, ARTICLES OF MANUFACTURE PRODUCED THEREFROM, AND METHODS FOR THEIR MANUFACTURE

PRIOR APPLICATIONS

This application is a continuation in part of application Ser. No. 09/706,590 filed Nov. 6, 2000 now U.S. Pat. No. 6,881,367.

FIELD OF INVENTION

The present invention relates to a composite material, articles of manufacture produced from the composite material and a method of producing articles of manufacture from the composite material.

BACKGROUND OF THE INVENTION

Wood has been milled into various different shapes for use as structural or decorative components in the building industry, as components in furniture, railcars, trailers, and the like for many, many years. Wood is structurally strong, useful and well adapted for use in many residential and commercial situations. However, under certain circumstances wood can have deterioration problems. Another problem with wood structural components is that the stronger woods are considerably denser than weaker woods. As a result, wood structural components tend to be very heavy. This is problematic in applications where weight is a concern. To overcome this problem a material, such as fiberglass or carbon fibers, which is stronger and lighter than hard woods can be used. Such materials provide superior strength combined with light weight, but the cost is very high, making them useful only in high value situations. Generally, they cannot be used cost effectively in normal wood replacement type applications.

Thus, when an application requires that the wood component be very strong, i.e., a weight bearing wall, hard wood, pretreated soft wood or reinforced soft wood is preferred. As a result the weight of the structure is excessive. In addition, due to the increase in cost of the milling processes, the reduction in supply, and the increase in the cost of treating lumber, wood products are slowly becoming more expensive as demand increases. Therefore, there is a need for a material that can provide strength without being too heavy or expensive. Although some wood substitutes are currently available (made as a first generation product using recycled polyethylene), it is believed that no one wood substitute provides the strength of real wood, with a decrease in the weight and cost of the final product. Wood is 2-5 times stronger than current wood replacement composites. Wood replacement composites are also very expensive and may cost 2-3 times the cost of construction grade lumber or 20-30% more than treated high grade soft woods.

Accordingly, a substantial need exists for an improved composite material that is equally strong or stronger than traditional milled woods, weighs less than milled wood, is maintenance-free, and is less expensive than milled wood. The present invention provides a composite material that can be shaped to produce articles of manufacture that possess the favorable aspects of wood without the negative aspects described above.

SUMMARY OF THE INVENTION

The invention is directed to a composite material comprising a fiber material and a thermoplastic. The fiber material may be wood, fiberglass, agricultural by-products, industrial by-products or any other material having a durable wood- or fiber-like consistency. The fiber materials can also be a mixture of different fibers, such as wood and fiberglass, wood and agricultural by-products, etc. The composite material may contain between about 40% to about 70% by weight of the fiber material and additives in an amount of about 0.1-30% by weight of the total weight of the article of manufacture. The remainder of the composite material comprises the thermoplastic material. As used herein "thermoplastic" and "thermoplastic material" has the same scope of meaning as "thermal plastic" or "thermal plastic material" as referenced in application Ser. No. 09/706,590, the entire specification of which application is incorporated herein by reference. The composite material may be used to make articles of manufacture.

The thermoplastic material of the composite material may be polyethylene or polypropylene. This material aids in binding the fiber material together so as to form a strong, durable article of manufacture. In fact, the thermoplastic material actually shrinks to grip the fiber material so as to hold the fiber material in place, as the thermoplastic cools. The composite material may contain between about 30% to about 60% by weight of thermoplastic material.

The invention is also directed to a process of producing an article of manufacture. This process produces an article of manufacture comprising the composite material, which comprises fiber material, thermoplastics and additives. The process may use any one or combination of the fibers discussed above. For example, when wood is used in making the composite material, the fibers are first screened through a 20-40 mesh screen and added to a mixing container. The screened fibers are than heated to remove moisture so that air pockets do not form when the water is converted into steam as the fiber material is processed.

Hot thermoplastic material is then added to the mixing container so that it comes in contact with the screened fibers. The thermoplastic material may be added to the screened fibers by injecting the thermoplastic material into the mixing containers. Injection of the hot thermoplastic material into the mixing container allows for precise measuring of the amount of thermoplastic material added to the mixture. Additives are added to the plastics stream as it is heated, melted and mixed.

Once the screened fibers are mixed with the hot thermoplastic, the resulting mixture is then placed in contact with a die. The die is used to produce the shape of the article of manufacture. Once shaped, the article of manufacture is cooled and cut to a desired shape and length. For example, the article of manufacture may be cut with an inline saw. Alternatively, the article of manufacture can be directly extruded to the desired shape from the composite material.

When fiberglass is used as the fiber material instead of wood, the fiberglass is chopped into ¼, ½, or ¾ inch lengths. Once the fiberglass is the correct size, the fiberglass chop is substituted for wood in the process described above on a weight basis. When fiberglass is mixed with wood to make the composite, fiberglass chop is added to the screened wood and the process described above is unchanged.

In another embodiment, fiberglass can be added to the process as a Twintex™ pellet having 60% fiberglass co-mingled with 40% polypropylene. The percentages may vary and are referred to as the load. The Twintex™ pellets can be chopped in the same ¼, ½ or ¾ inch lengths as discussed above. Because this is a polypropylene co-mingle, the pellet is introduced into the thermoplastic barrel rather than the wood barrel of the extruder.

The article of manufacture produced is durable, strong, and long lasting. These characteristics make the article of manufacture a good replacement for wood, and other structural and decorative materials in places where conditions are extreme and other materials have a short life span. For example, the article of manufacture can be used in the construction of decks, floors, sidewalls in railcars, trucks and trailers, as well as fences and residential home construction.

An article of manufacture is also disclosed comprising a core having a surface, the core comprising fiber material in an amount of about 40% to about 70%, a thermoplastic material in an amount of about 30% to about 60% and an overlay contacting at least a portion of the core surface, the overlay comprising fiberglass.

A composite material is further disclosed comprising a wood fiber in the amount of between about 25 to 40% by weight of the article, a fiberglass material in the amount of between about 25-40% by weight of the article; and a thermoplastic in the amount of between about 20-50% of the article.

DETAILED DESCRIPTION OF THE INVENTION

The present invention is directed to an article of manufacture comprising a composite material as well as a process for making the article of manufacture. The preferred composite material has a controlled water content which ensures high quality physical properties in the articles of manufacture that are produced from the composite material.

The composite material may contain fibers from a variety of different sources such as wood, fiberglass, industrial by-products and agricultural by-products. Wood fibers that can be used to make the composite material include, but are not limited to, fibers from oak, birch, cedar, maple, and other types of hard wood trees. Fiberglass that can be used to make the composite material can be in the form of "chop" or in a pelletized form that is commercially available. Fiberglass may also be used that is already mixed (co-mingled) with polypropylene into strands or pellets. This mixture is also commercially available. Fiberglass can be added to or can be used to replace wood fiber on a one to one basis, however, the increase in cost of fiberglass can be prohibitive. The choice to use wood, fiberglass, or a fiberglass and wood mixture, can be decided on an individual customer basis.

Industrial by-product fibers that can be used to make the composite material include mica industrial by-products. These are sometimes used to add strength, fire retardation or moisture resistance. Agricultural by-product fibers that can be used to make the composite material include cornstalks, wheat straw, sisal, bamboo reeds, and hemp, as well as others.

Cost, availability, and stable supply make wood fibers (880 Million tons in 1999 went to landfills) the preferred fiber source for the composite material. Special needs such as using fiberglass as a fiber source to increase strength of the composite, however, might justify the use of any one of the other fibers listed above, regardless of the increased cost of the fibers as compared to wood.

The composite material contains about 40% to about 70% of fiber material by weight. Preferable, the composite material contains about 60% of fiber by weight. More preferably, the composite material contains about 50% of fiber material by weight.

The amount and type of fiber material used to make the composite material will affect the strength, weight and density of the article of manufacture produced from the composite material. If the fiber material used is very dense, the quantity of this fiber used to make the composite may be lower than if a less dense fiber material is used. Although lower weight (as compared to wood) can be an advantage of the composite materials of the invention, another significant advantage in using a composite material compared to a cheaper alternative (such as wood) is that for a slight increase in cost, the product is maintenance free.

One embodiment of the invention, uses a wood chip-plastic mix, and does not have the same characteristics of a normal high cost, high strength composite such as pure fiberglass. Because the wood chip-plastic mix takes on the characteristics of the wood chip itself, it has properties similar to these of wood. In other words, it is very dense (we replace the cellular air spaces with plastic which makes it as much as 20 to 30% heavier then wood), and in most cases heavier than wood. To eliminate weight, it is possible to use foaming agents to put air pockets or cells in the composite giving it a wood like characteristic. A computer may be used to optimize a profile that maintains the strength (because of the design) but lowers the weight. Even in these cases, the composite material is only slightly lighter than the wood it replaces.

The designs shown in FIGS. 1, 2, 3, 4a and 4b are proprietary designs that aid in providing the same or greater strength of a full panel made of wood (depending on the fiber source and additives used), while being the same or slightly less in weight. All in all, the main advantage of the article of manufacture is not that it weighs less than wood, but rather that it is maintenance-free, i.e., the bugs will not eat it. It will not rot, split or crack and never needs to be painted.

An article of manufacture made from the present invention is made with polypropylene and polyethylene, and is formed in the designs shown in FIGS. 1, 2, 3, 4a and 4b and has the strength of wood. The strength of this product is achieved using an engineered polymer (i.e. BP Amoco 9433 polypropylene). Using the engineered polymer increases or maintains the strength of wood but keeps the cost at about the same level as wood. In other words, the cost of this product is very similar to first generation type products, but, wood is still a cheap alternative. As stated above, the trade off between wood and composite is that the composite is maintenance free and has a considerably longer half life as compared to wood.

An article of manufacture made from the present invention preferably comprises polypropylene as the thermoplastic material and may be formed as illustrated in FIGS. 1, 2, 3, 4a and 4b. The article has variable strengths approaching and/or exceeding the strength of wood, depending on the characteristics sought. For instance, a wood fiber loaded polymer composite may have a modulus of elasticity starting at about 200,000 psi. By manipulating the composite ingredients in the extrusion mixture, the strength properties of the article, including its modulus of elasticity, can be significantly increased. By using polypropylene instead of a polyethylene as the thermoplastic material, the base modulus of elasticity can increase to 500,000 psi. for articles of manufacture. Using a high crystalline polypropylene may increase the modulus of elasticity to about 800,000 psi as a base. Adding binding agents can increase the modulus of elasticity to approximately 1,200,000 psi. Adding fiberglass material can increase the modulus of elasticity to over 2,000,000 psi. By wrapping the extruded product with one or more fiberglass material overlay the modulus of elasticity can increase to over 3,000,000 psi and up to about 4,000,000 psi.

Alternatively, fiberglass chop or pellets can be used to replace wood on a one to one weight basis. This provides increased strength to the composite but may increase the cost of the final product. In situations where increased strength is required, fiberglass can be used to replace wood fiber. For example, a mix of 60% ½ inch fiberglass chop and 40% polypropylene would have a modulus of elasticity of 2.5 Million or higher (compared to oak at approximately 1.8 Million). Similarly, a mix of 35% fiberglass chop, 25% wood fiber, and 40% plastic would have a modulus of elasticity of about 1.6-1.7 Million which is equivalent to oak. In addition, this product would also have a tensile modulus of about 25,000 which gives it twice the strength of high end oak. Straight fiberglass chop may also be used to make the composite.

If straight fiberglass chop is used, it can be added to the wood stream as a straight fiber source. In other words, the fiberglass can be fed directly into the extruder, at the same time as wood. As the wood dries, the fiberglass will mix with the wood. The thermoplastic material is then added as if wood was the only fiber used and extruded to the final product. In an alternative embodiment, fiberglass is added to the process as a Twintex™ pellet that is a comingle of 60% fiberglass and 40% polypropylene.

In terms of strength, articles of manufacture which use fiberglass will achieve the tensile strength of some soft woods and will achieve about 80% of the strength of some hard woods. With the new designs of the present invention and engineered nucleated polymer, a composite having the strength and modulus of elasticity equal to that of wood can be created. For example, modulus of elasticity of 1.2-4.0 million psi, can be created using the composite of the invention as well as other strength enhancing features such as application of an overlay (e.g., fiberglass wrapping or strapping), incorporating reinforcing strands into the composite, and combinations thereof.

As stated above, the composite material also contains thermoplastic material. Thermoplastic material is used to bind the fiber material together to produce a solid composite material used to form the articles of manufacture. The thermoplastics operate by shrinking to grip the wood/fiberglass pieces as the thermoplastic cools. The preferred thermoplastics are polyethylene and polypropylene. The most preferred thermoplastic is polypropylene. To keep the cost of the article of manufacture made from the composite material low, industrial grade thermoplastic materials can be used. To obtain the strengths and the moduluses shown above, an engineered grade of polymer that has been nucleated should be used. The nucleated process adds about 20-25% to the modulus of elasticity which is critical in keeping the characteristics high.

Since polyethylene is used heavily in society and can be recycled, it is readily available and is in stable supply. However, it is more costly than polypropylene.

Recycled polypropylene (the cheapest grade) costs about 12-15 cents per pound, whereas engineered polypropylene cost about 40-50 cents per pound. In some cases, a blend of various grades can be mixed together to reduce cost without diluting the main characteristics of the product. For example, a blend can be used in cases where the final product does not require extreme strength, such as no load fence boards.

In addition to being less costly, polypropylene has a number of other advantages over polyethylene. An article of manufacture made from a composite material containing polypropylene is stronger than one made from a composite material containing polyethylene. Thus, polypropylene provides additional strength to the composite material as compared to polyethylene. Since polypropylene is an under utilized by-product of gasoline production, polypropylene is insulated from price fluctuations associated with the mainstream plastics market. For this reason, as stated above, polypropylene is a cheaper alternative to polyethylene.

To achieve similar characteristics to wood, a nucleated polymer, for instance, BP Amoco 943, can be used. This is a high crystalline polymer having superior strength and modulus of elasticity that is preferred when the composite material is used in construction and heavy duty applications. This polymer may be further softened, depending on the application specifications, by the addition of a rubber formula, such as an elastomeric alloy or elastomer compound.

The composite material may also contain a mixture of polyethylene and polypropylene as the thermoplastic material. Characteristics normally not associated with each of the thermoplastics individually, may be realized when a mixture of polyethylene and polypropylene is used. For example, impact resistance and rigidity are two characteristics that are very important in the production of an article of manufacture made from the composite material. As impact resistance increases, rigidity decreases. In other words, the more flexible the article of manufacture made from the composite material is, the greater the impact it can absorb.

In order not to lose the important characteristics of the composition discussed above, polyethylene can be added only in small quantities before it begins to change the overall characteristics of the composite material. No more than 15% polyethylene can be added to the mixture before certain characteristics of the composite material begin to erode. Preferably, no more than 10% polyethylene is added to mixed composite material. Polyethylene, however, can be added in a capstock mix that is layered on the surface of the article of manufacture. In this manner the body of the article of manufacture made from the composite is not affected.

Articles of manufacture made from composite material containing various combinations of polypropylene and polyethylene provide different degrees of rigidity and impact resistance. Therefore, in some cases the best thermoplastic material used to make the composite is a mixture of both polyethylene and polypropylene. One provider of the polypropylene used to make the composite material is BP Amoco. One polypropylene provided by this company is called ACCPRO 9433 or 9434. In addition, similar products are also available from Solvay, and other suppliers.

To add impact resistance to the polymer, a low density polyethylene in almost any quantity can be added to the polypropylene without losing the traits associated with the use of polypropylene. If a high density polyethylene is added to the homo-polymer to make a co-polymer, only low amounts of polyethylene can be added before the polypropylene traits are lost. Therefore, the percentage of polyethylene verses polypropylene depends on the density of polyethylene being added. For example, an article of manufacture using a composite material having 15% of polyethylene and 85% of polypropylene as the thermoplastic material will provide moderate rigidity and impact resistance to the article of manufacture. Alternatively, increasing the percentage of polyethylene and decreasing the percentage of polypropylene will produce an article of manufacture with increased rigidity and decreased impact resistance. Thus, a composite material can be synthesized having desired characteristics not only by varying the type of fiber material used, but also by changing the percentage of polyethylene and polypropylene combined to make the composite. One skilled in the art after reading the present disclosure, would be able to prepare an article of manufacture having desired characteristics by varying the percentage of polyethylene and polypropylene used to bind the fiber material of the composite.

The composite material used to make the article of manufacture may also include enhancers which facilitate the mixing of the fiber material and thermoplastic. Examples of enhancers include, but are not limited to, fatty acids, stearic acid, benzyl peroxide, dichloro-s-trianzine, isocyanates, and maleic anhydride. These enhancers are used to disaggregate the solid fibers, allowing for better adhesion between the fiber material and thermoplastic. A similar phenomena occurs when the polypropylene is run hotter.

In one embodiment of the invention, the enhancer used is maleic anhydride. Maleic anhydride is available in two forms. The first being as an additive that can be added to the process stream at the production line. The second form is already pelletized in the thermoplastic material and is known as Maliated Polypropylene (MAPP). MAPP is available from Rohm and Haas Company (Tymor 2E02 and Tymor 2500EX), Uniroyal Chemical, Eastman Chemical and Honeywell. Several other oils are also available that serve the same purpose.

Maleic anhydride is the preferred enhancer because it has been shown to provide a bond between fillers containing hydroxyl groups, i.e., wood fiber, and a polymer matrix, i.e., polypropylene. Therefore an article of manufacture made from a composite material containing maleic anhydride exhibits increased strength.

The main purpose of using enhancers is to increase the percentage of wood coverage of the fiber with the thermoplastic. This is known in the industry as increasing the percentage of "wet out" of the wood fiber. Both the choice and the amount of enhancer used in the composite material is a function of the type and amount of fibers and thermoplastic material used to make the composite. The mixing compounding conditions also play a role in choosing the amount and type of enhancer. For example, if the composite material contains wood as the fiber material and polypropylene as one of the thermoplastics in a co-polymer then the preferred enhancer is maleic anhydride. Since it is within the scope of the invention to use a combination of thermoplastics, it is also within the scope of the invention to use a combination of enhancers when making the composite material. The amount of enhancer that can be added to the fiber/plastic mixture can be up to 5% by weight. Preferably up to 2% by weight and most preferably up to 1% by weight.

Strength of the resulting article is critical for high impact construction applications. Articles with a modulus of elasticity of 1 million psi and under may be suitable for certain residential applications, such as residential decking and other home improvement applications, yet these articles may be insufficiently strong for most industrial or heavy duty transportation construction applications. It has been found that enhanced strength of the article formed of the composite materials may be significantly increased beyond expectations, to create construction grade articles that can replace hard wood, fiberglass, and other high tensile strength materials.

The strength of the composite article may be enhanced by the addition of fiberglass to the composite material. As used herein, fiberglass material encompasses relatively pure fiberglass as well as fiberglass co-mingles, such as Twintex, or other fiberglass and polypropylene co-mingle. Addition of fiberglass material to the mixture, for instance, in the form of a polypropylene/fiberglass co-mingle, for direct extrusion with an additional fiber material, such as wood fiber as well as a thermoplastic material, in an amount between about 25% to 40% by weight of the composite article yields strengthened articles having a modulus of elasticity in excess of 1,200,000 psi up to about 2,500,000 psi and a tensile strength in excess of 5,000 psi up to about 12,500 psi. In one example, a composite article is composed of 40% A9433 polymer, 30% wood fiber and 30% fiberglass/polypropylene co-mingle, mixed and directly extruded, would yield articles having a modulus of elasticity between about 1,800,000 psi and about 2,500,000 psi and tensile strengths between about 10,000 psi and about 12,500 psi.

In addition to adding fiberglass material to the extrusion mixture to form the composite article, the composite article may be strengthened through the application of overlays thereto, where the overlays also are composed of fiberglass materials, for instance, fiberglass/polymer co-mingles. The overlays contact at least a portion of the surface of the composite article, the composite article becoming a core for the overlay. As such, the core is fashioned from composite materials according to the invention. Such overlays can be used whether or not the core contains fiberglass material.

One overlay type is a wrap enveloping the composite material core, contacting the core continuously over at least a portion of the surface thereof. The wrap may be composed of a uni- or bidirectional fiberglass/polypropylene co-mingle mat applied to the core under pressure after the core is extruded and before it has cooled. Under sufficient pressure, and in the presence of the still hot core, the polypropylene in the mat blends with the polypropylene making up at least part of the thermoplastic material in the core. Thicknesses of the resulting wrap are between about 1/16 inches and about 1/4 inches, and preferably about 1/8 inches. One or multiple wraps of fiberglass material can be applied to the composite core, depending on the strength required. The resulting articles have a modulus of elasticity in the range of between 2,500,000 and about 4,000,000 psi and with a tensile strength of between about 10,000 to about 37,000 psi. Articles with higher strengths and moduluses may also be achieved through application of multiple layers. As an example, application of a fiberglass material mat as a wrap in a thickness of about 1/8 inches to a composite material core, composed of 40% A9433 polymer and 60% wood fiber increased the modulus of elasticity from approximately between 800,000 to about 1,000,000 psi to between about 2,000,000 to about 2,500,000 psi, with a tensile strength increase from between about 3,000 to about 5,000 psi to between about 10,000 to about 12,000 psi.

Application of a wrap to a composite material core composed in part of fiberglass material shows further substantially enhanced strength properties. For example, a 1/8 inch thick wrap of fiberglass material wrap applied to a composite core composed of 40% A9433 polymer, 30% wood fiber and 30% fiberglass, yielded articles having a modulus of elasticity between about 2,500,000 and 3,500,000 psi, and a tensile strength of between about 20,000 psi and 25,000 psi. Application of a second fiberglass material mat as a wrap, to a thickness of 1/4 inches, yielded articles having a modulus of elasticity between about 3,500,000 and about 4,000,000 and a tensile strength of between about 35,000 to about 37,000 psi.

Enhanced strength properties may also be imparted to composite articles of the invention by strapping the extruded article surface with strands of a fiberglass material, such as a fiberglass/polypropylene co-mingle. The strapping is applied to a core composite material that is extruded with slight depressions to accommodate the strapping. The article is cooled to at least partial rigidity to withstand external pressure created by the strapping. The article surface is heated and the fiberglass material strapping is applied, for instance, in one inch wide straps, in an alternating direction, such that polypropylene within the fiberglass material blends with the polypropylene in the core composite material. As an example, application of a 1 inch wide alternating strapping of fiberglass material to a composite material core composed of 40% A9433 polymer and 60% wood fiber increased the resulting modulus of elasticity to between about 1,500,000 to about 2,000,000 psi with a tensile strength increase to between about 5,000 to about 7,000 psi, which is nearly double the modulus of elasticity and tensile strength of the composite material core alone.

Once the fiber material, thermoplastic(s), and enhancer(s) are mixed, a dye coloring may be added to the composite material. The dye coloring added to the composite material should be thoroughly mixed so that the resulting composite material is uniform in color. When the article of manufacture is formed from the composite material, the article of manufacture will also have a uniform color. The amount of the color added to the composite depends on the shade or intensity of color desired. In other words, when a dark color is desired, more dye is added to the composite material than when a lighter color scheme is desired. Either the wood mix or the plastic stream or both can be dyed to achieve the desired affect.

Alternatively, coloring of the article can be accomplished by the addition of a polymer based coloring agent to the mixture prior to extrusion, wherein the polymer has a higher melt flow index than the polymer comprising the thermoplastic material used in the composite material. As such, during extrusion temperatures, upon melting the polymer base for the coloring agent will distribute the coloring agent throughout the composite material.

Articles of manufacture may be subjected to a variety of different extremes depending on where it is ultimately used. Different additives can be infused into the composite material used to make the article of manufacturer in order to reduce the damage caused by exposure to such extremes.

For example, when the article of manufacture is made from the composite material that is used under conditions of extreme heat and/or flame, fire retardant additives may be added to the composite material to prevent damage to the article of manufacture. Examples of heat and/or fire retardants include Bromium or Antimoniumoxide. Similarly, if the article of manufacture is used in places where it may be exposed to insects, insect resistance additives may also be added to the composite material to reduce or prevent damage to the article of manufacture by insects. Insect resistance can also be achieved upon formation of the composite. For example, if a board is constructed from 40% wood and 60% polymer it is probable that the polymer will effectively cover the wood thus making it insect or rot resistant. In this case, no additional additives are needed.

To protect the article of manufacture from ultraviolet light (UV), UV-resistance additives can be added to the composite material to reduce or prevent damage to the article of manufacture by UV light. There are a number of levels of UV protection. The first level is when UV light protectant chemical is added to the process stream or as an addition to the pelletized thermoplastic material. This can be either added as part of the thermoplastic pelletizing process or grouped into an additive package that is infused into the production stream.

The main goal of the first level of UV protection is to protect the thermoplastic matrix from degrading in the sun and causing a catostrophic failure. The UV additives are added to the thermoplastic at less than 1% of the total thermoplastic weight. While this amount will protect the plastic, it will not protect the wood chip filler. In other words, the product will still fade to the color of aged wood since the wood chips are not protected and will continue the fading and aging process. Similarly, a UV protectant can also be added to the wood stream.

The second level, or more advanced level, of UV protection inhibits wood fading. Here a "capstock" is added to the surface of the board that has additives to protect against the UV wavelengths that fade wood. This capstock can be applied as a co-extrusion or can be applied as a veil that protects the surface and product against UV damage. This is a cheaper method of UV protectant than level one but is more challenging to apply.

In one embodiment, a veil is specially manufactured as a polyethylene or polypropylene veil that is less than 8 millimeters thick. This veil contains the UV protectors added to the thermoplastic prior to application. Thus, the veil when applied protects the complete structure of the composite including the wood components.

To protect the article of manufacture from fungus or the like, fungus resistance additives may be added to the composite material to reduce or prevent damage to the article of manufacture by excessive growth of fugii or the like. If the amount of thermoplastic material or fiberglass is increased so that it is covers the wood fibers it is possible to eliminate the need to add additives designed to protect the product from rot, insects, or fungus.

To protect the article of manufacture from oxidation, heat resistance antioxidants may be added to the composite material.

The composite material may contain one or more of the additives described above depending on the conditions in which the article of manufacture made from the composite will be used. The composite material may contain additives in an amount of up to 5% of the total weight of the composite material, preferably no more than 2%, most preferably, no more than 1%.

After all the ingredients have been added to the composite material, the composite material is shaped into the article of manufacture. A film or veil or co-extrusion layer can then be added to the surface of the article of manufacture to provide additional durability to its surface. The film or veil is selected from the group consisting of polypropylene, polyethylene and polyester. The film or veil increases impact resistance, scuff resistance, fading and weathering.

The process of making the composite material, forming it into an article of manufacture and adding a film and/or veil is described below.

A. Preparing the Ingredients

When wood fiber is used to make the composite material, special care must be taken to insure that the supply of wood fiber is consistent in size, properly screened and free of contamination.

The first step in preparing the wood fiber is to sort and classify the wood source. For example, soft woods need to be sorted from hardwoods and colored woods need to be sorted from plain woods. Pine needs to be sorted from Oak and even though both Oak and Walnut are hardwoods, they are of different color so they must also be sorted to maintain uniformity. This sorting process allows the texture and other characteristics of the fiber supply to be consistent, which is very important in producing a consistent, quality oriented product.

Sorting texture and color before using the wood fiber to make the composite produces an article of manufacture with more uniform handling, and better structural and aesthetic qualities than processes using a composite of wood fibers straight from recycled sources. The use of hardwood fibers as the fiber source in the composite used to make the article of manufacture greatly increases nail and screw holding capacity, as well as, increasing the overall strength of the article of manufacture made from the composite.

After sorting the different woods into "batches," the product is ground into wood chips using at least a two stage grinding process. The "batches" are first ground into a rough grind similar in appearance to a garden mulch with sizes ranging from a very small wood flour particle up through strips or chunks of wood that may be as large as six inches long. The first grind is done with a large commercial sized tub or horizontal grinder having large capacity and power. Once the first grind is completed, the product of the first grind is reground using a smaller grinder or a hammer mill which again provides a variety of sizes of wood particles ranging from the very small wood flour category up to saw dust size particles that may pass over a 20 mesh screen. It may take up to three secondary grinds or more to produce a product that is acceptable and consistent in size.

As mentioned above, size and consistency of size is very important in how well the wood fiber works in the process and directly affects the quality and attractiveness of the article of manufacture made from the composite material. To assure size and consistency of the wood fiber, the wood fiber is screened over a 30-50 mesh screen. Preferred fibers are those screened over a 40 mesh screen. The small and consistent size of wood fiber makes a very smooth product finish.

If the wood fiber source is screened too small, the weight of the board increases and the strength of the board decreases. This is undesirable. Wood ground and screened over a 40 mesh screen typically weights between 13 and 15 pounds per cubic foot depending on whether it is soft or hardwood, soft wood being lighter. This compares to unground wood that weighs 30-35 pounds per cubic foot. The difference in the weight is contributed to the amount of cell or air space that is present in a cubic foot of wood. Obviously, 40 mesh ground wood has far more air space than just plain unground wood. Taking this further, the finer the grind of the wood, the less air space and the heavier the weight of the wood fiber per cubic foot. Weight is one factor that is considered in making the article of manufacture. Overall, a preferred article of manufacture should weigh the same or less than the wood it is replacing. One way this can be achieved, as discussed above, is by using voids in the final product. Thus, it has been found that wood ground through a 40 mesh or slightly larger screen makes a product that most closely resembles wood. However, weight can continue to be a problem because as the thermoplastic material is added, having a density of 40 pounds per cubic foot, the weight of the composite material increases.

Figure 1:
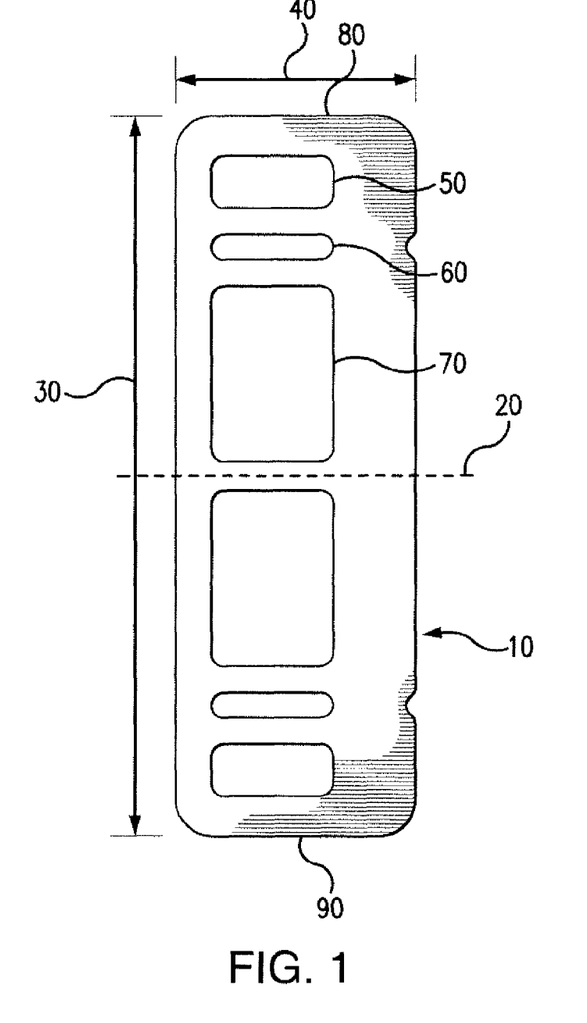
FIG. 1 shows a schematic diagram of a panel having a pattern of "voids" which is made from the composite material.

FIG. 1 shows a panel made of the composite material of the invention which has several strategically placed voids 10. These voids are used to reduce the overall weight and cost of the product but do to compromise the integrity of the final product. The "void" pattern shown in FIG. 1 comprises six spaces, 3 of which are mirror images of the other three and are separated by a median line 20. The length of the panel 30 is at least double the width of the panel 40. The voids are positioned so that they are off-center so as to produce a panel having more solid space on one side compared to the other.

The first void 50, is larger than the second void 60, but smaller than the third void 70. The three voids are positioned below one another when moving from the top of the panel 80 lengthwise to the bottom of the panel 90. Three identical voids are positioned as a mirror image across the median line 20. The voids provide an article of manufacture having superior strength and at the same time decreased weight as compared to other wood products.

Figure 2:
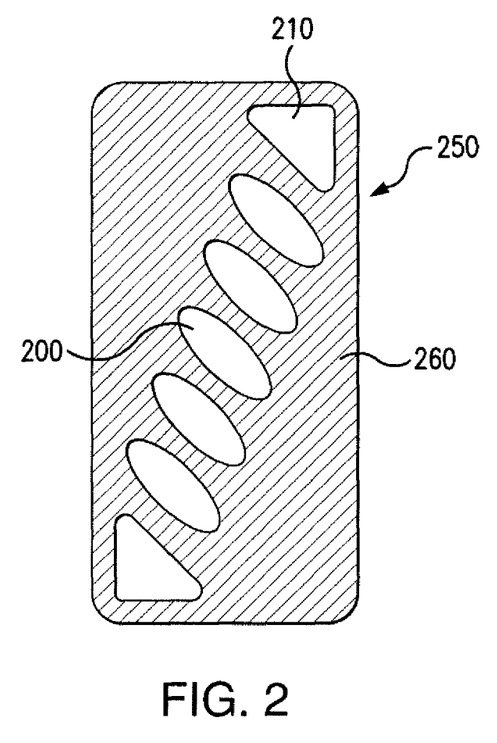
FIG. 2 shows a schematic diagram of a panel having a pattern of "voids" different from that of FIG. 1.

Similarly, FIG. 2 also shows a panel made of the composite of the inventor which has several strategically placed voids. Two of the voids 210 are in the form of a rounded triangle and are located at each end of a series of voids. Five of the voids 200 are "pill shaped" voids that are positioned between the two end voids 210 with a given amount of space between each void. This space between and the number and size of each void will vary according to the overall length of a panel. The overall structure 250 has a solid portion 260 that surrounds each of the voids. The length of the structure 260 is at least double that of the width of structure 260. This arrangement of voids and solid surfaces produces a strong panel having reduced weight.

It is further within the scope and contemplation of the invention that the voids are filled with a foam to enhance strength yet add minimal weight to the article. A foaming agent, which may be composed of 30% wood fiber and 70% thermoplastic, such as polypropylene, is added to the voids by introducing the foaming agent through the extrusion die by using an additional extruder that pumps the foaming agent into the voids of the extruded article during extrusion of the article.

To further control the weight of the article of manufacture, a mix of soft woods and hardwoods may be used to produce the composite material. In this manner a lower weight is traded for the ease of processing, strength and production efficiencies of hardwoods.

Size of the wood fiber is also a factor in the strength of the article of manufacture produced from the composite material. Strength of the article of manufacture is a function of fiber length and direction, which is also a function of wood fiber size. All of these factors combined are directly related to the final weight of the article of manufacture made from the composite material. Wood fiber size and composite material produced from wood fibers sized through a 20 to 40 mesh screen have the most desirable characteristic.

Moisture is another critical factor that must be controlled when handling wood. A moisture of 6% is desirable and allows for the most efficient handling of the wood fiber. If moisture increases, the wood fiber tends to clump and does not handle efficiently. Drying the wood so that it has a moisture content of less than 6% requires too much energy. Moreover, the wood will regain the moisture in the storage tanks. Further drying of the wood fiber will occur in the mechanical extrusion of the manufacture process.

The other ingredients added to the composite material, including other sources of fiber such as fiberglass, agricultural and industrial by products, enhancers and protective additives do not require any special handling or preparation. The fiber materials can be substituted for the wood fiber on an equivalent weight basis and the enhancers and protective additives are used in small quantities and come ready to use straight from the manufacturers. Grades of plastics can be used to bind the wood or other fiber materials used together.

The Process

The composite material may be made using a Davis-Standard Woodtruder™ extruder line. The process below is described using wood as an example. It is noted, however, that the same process can be used to produce a composite material comprising fiberglass, industrial by-products, agricultural by-products or mixtures thereof, instead of wood fiber.

The process begins by screening the wood fiber over a 20-40 mesh screen to produce wood fiber having a consistent size and approximately 6% moisture. This fiber is fed into the main extruder twin screw barrel via a gravimetric feeder. This type of feed system provides a consistent feed of wood fiber on a weight basis. Monitoring the weight is very important to get a consistent ingredient mix, which in turn affects the final quality of the article of manufacture produced from the composite material.

The main barrel of the extruder is equipped with counter-rotating twin screws that push the fiber material forward at a low revolutions per minute (rpm) and low shear. A heated venting area of the extruder removes moisture from the fiber material. This allows a high volume of fiber material to be dried "in-line" during production. Removal of moisture is critical to the process because any moisture remaining in the wood fiber/plastic blend is converted to steam during the process and manifests itself in the form of foam. This can disrupt the processes and lead to an unacceptable finished article of manufacture.

In the initial extrusion process, moisture is managed by a combination of predrying the fiber material from their ambient moisture content of 6-8% to 2-3%; and by applying a vacuum to the vent zones in the extruder barrel during compounding to remove the remaining moisture. Temperature during the wood drying process is maintained at approximately 190 degrees F., to avoid scorching or burning of the wood fiber. Maintaining the temperature below the melting point of the thermoplastic avoids degradation of the wood fiber and a reduction in strength of the final product.

In a separate extruder, the thermoplastic is melted to a temperature of approximately 425 degrees F. During the melting process, the additives are added and mixed into the melted thermoplastic. By using a separate extruder for melting the thermoplastic and mixing of the additives, this process can be completed at a higher temperature than would be possible if a single extruder were used by eliminating the risk of scorching or burning the wood fiber during the melting and additive mixing process. The high temperature used in this process allows the melted thermoplastic to completely encapsulate the wood fiber once it is added to the screened wood fiber. The addition of an enhancer such as maleic anhydride, facilitates the forming of a very strong bond between the wood fiber and the thermoplastic. Other enhancers discussed above can be added as well.

The hot thermoplastic and additive mixture is injected into the mixing section of the main extruder barrel. Depending on the product, about 40% to about 70% of the mixture by weight is wood fiber and the thermoplastic and additives combined comprise about 30% to about 60% of the mixture by weight. Additives can comprise up to about 5% of the mixture by weight, depending on the number of additives and type of additives selected. The mixing section thoroughly compounds the plastic/additive/fiber composite. The mix is then vacuum vented to remove any remaining moisture.

If too much wood is added, the wood fibers are not thoroughly covered by the thermoplastic and the additive mixture. This results in a decrease in strength and physical properties of the article of manufacture made from the composite material. For example too much wood may cause the product to rot, mold and absorb water like other wood products. Another problem that arises when too much wood is added to the mixture is that the article of manufacture made from the composite material becomes quite brittle and is subject to impact breakage. Therefore, it is essential that the amount of wood fiber added to make the composite material is strictly controlled.

The plastic/additive/fiber composite material is moved through the metering section of the barrel to dies that provide the shape for the article of manufacture. It is important to shape the material while it is still hot. The composite material can be extruded with voids in the interior of the shape to facilitate cooling, curing and also to reduce the weight of the resulting article of manufacture. The cross-section of the article of manufacture has been engineered to create the voids while maintaining the strength of the article of manufacture. In other words, the voids are optimized to create the largest void space, lowest weight and maximum strength.

Leaving the die, the article of manufacture is cooled in two cooling tanks, each 20 feet long. In the first tank, the article of manufacture enters the tank at approximately 425 degrees F. and is cooled to approximately 200 degrees F. using a water spray system that sprays directly on each surface of the article of manufacture. The water spray is managed so that it is sprayed equally to all surfaces at the same time so as to dissipate the heat evenly. Even dispersion of the heat prevents warping and surface irregularity of the article of manufacture. The temperature of the water used to cool the article of manufacture is held constant at 80 degrees F. and is circulated through a system wide cooling tower. To insure that the cooling water is evenly dispersed on the article of manufacture, a matted type conveyor belt is used. Using a matted type conveyor belt permits water to be sprayed over the total surface of the article of manufacture resulting in even cooling. This is in contrast to a solid conveyor that would not allow the cooling water to spray over the total surface of the article of manufacture. In addition, the afore-mentioned cooling tank allows the article of manufacture made from the extruded composite material to be cooled and pulled through the cooling tanks free of the stress normally associated with mechanical pullers.

In the second cooling tank, the article of manufacture is cooled from approximately 200 degrees F. to room temperature. In this tank, chilled water is used to do a final cure of the article of manufacture. The temperature of the water used in this process is approximately 40 degrees F. and is sprayed on the surfaces of the article of manufacture in the same manner as water was spayed on the surfaces of the article of manufacture in tank one.

After proper cooling and curing the article of manufacture is sawed to desired lengths with an in line cutoff saw. The article of manufacture can be cut into building materials including building panels, railcar floors, railcar walls, truck floors, truck walls, window sills, window jams, doors, house siding, garage doors, furniture and other articles of manufacture that is normally made from wood or wood-like products.

Alternatively, the properties of the article may be enhanced by the application of an overlay. One type of overlay is a fiberglass material wrap applied to a core composed of the composite material. Preferably, the composite material core is extruded separately from the wrapping applied. The wrapping may then be applied under pressure to the core after extrusion of the core while it is still hot. This involves reheating the core to temperatures in excess of 400 degrees but less than about 500 degrees. This softens the surface of the product sufficiently for application of a fiberglass material wrap, which may be a fiberglass/polypropylene co-mingle mat, such as that manufactured by Vetrotex, to adhere to the composite core and blend with the softened polypropylene in the core. The mat is applied to the core under pressures exceeding about 80 psi.

Alternatively, a thermal set of relatively pure fiberglass pulled through a resin bath is applied under pressure to the core. In an alternative embodiment, the fiberglass material used in the wrap is a fiberglass/polypropylene mat extruded as a hollow piece having the desired outer dimension and defining an internal space. The forming is done using a forming die that first heats the mat to over 400 degrees F. The heating may be done in the first section of the extrusion die. To form the desired shape, the mat contacts a heated mandrel inside the die section. The core of composite material mixture enters the first section of the extruder and is extruded under pressure, through the mandrel, to fill the space in the heated mat. The pressure of the extruded core replaces the mandrel as the extrusion continues, maintaining integrity and stability of the core and wrap. The extrusion moves from the heating section of the die to a cooling section where it leaves the die. Water spray cooling tanks could be used at this point to provide additional cooling. The extrusion is then cut to the desired length and proportion.

Figure 3:
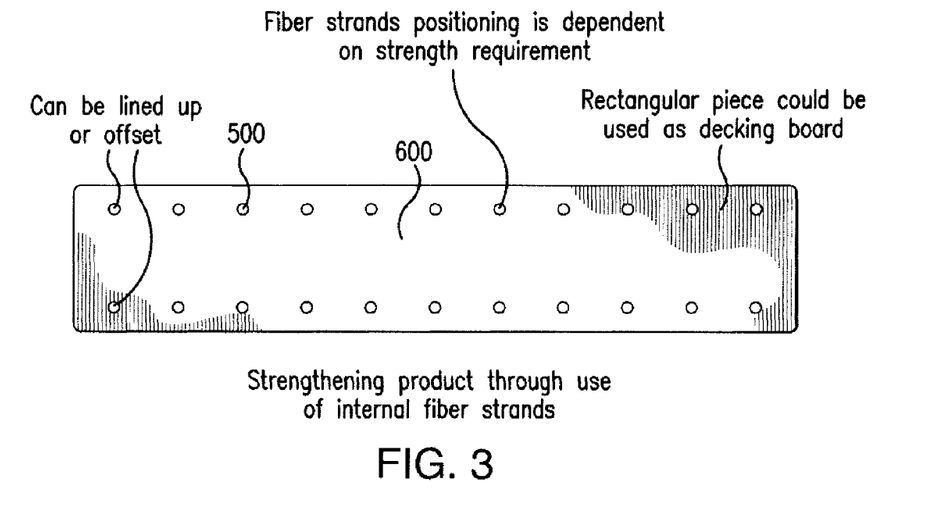
FIG. 3 illustrates a cross section of a panel including reinforcing strands

FIG. 3 illustrates a further embodiment of the invention using fiberglass material strands as reinforcement to a composite article. In this embodiment, article 600, which may be a board or other article with a cross-sectional portion, incorporates strands 500 therewithin to provide reinforcement and additional strength properties. Strands 500 are continuous over at least a portion of the composite article 600 and may be spaced within the composite article according to design dictates. The strands are introduced into the composite article during extrusion, preferably using a cross-head die to allow the fiberglass strands to be inserted in the profile of the article during the extrusion. As such, the fiberglass strands are pulled through the die and the extruded composite material forms around them. The fiberglass strands may be relatively pure fiberglass or a fiberglass material including other materials, such as polypropylene and may be treated with compatibility agents to aid any polymer blending that may occur during the extrusion. As shown in FIG. 3 strands 500 become part of the cross-sectional structure of the composite material extrusion.

Figure 4A:
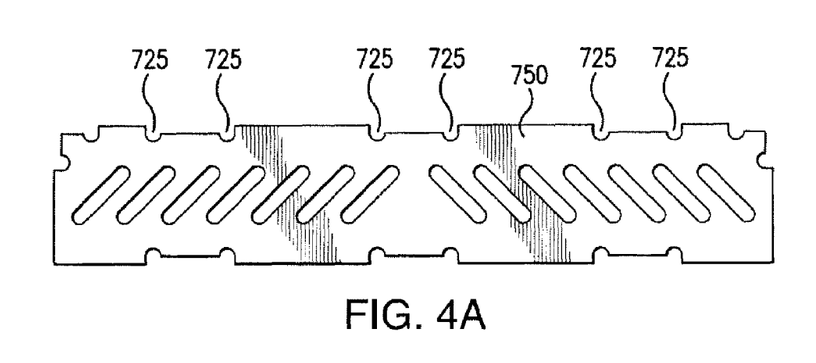
FIG. 4a illustrates a cross section of a panel having depressions to receive a strapping overlay.
Figure 4B:
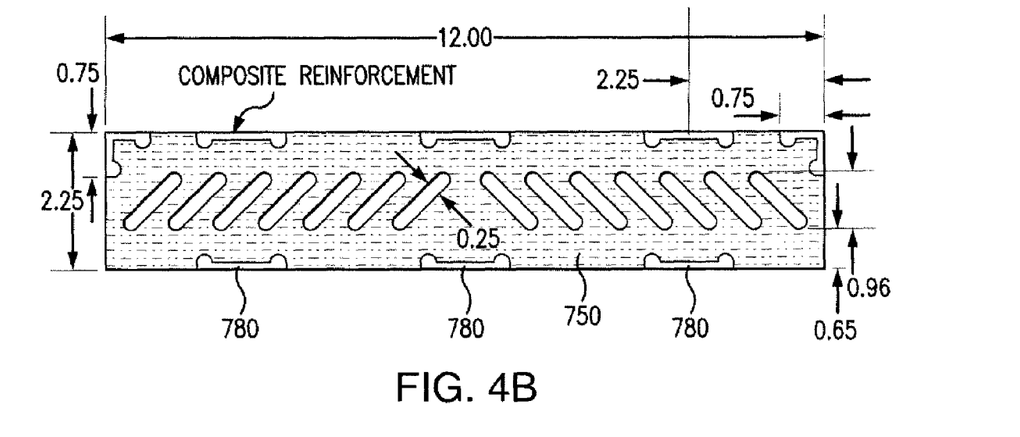
FIG. 4b illustrates a cross section of a panel having a strapping overlay.

FIGS. 4a and 4b illustrates a further overlay type wherein a strapping of fiberglass material is applied to a core of composite material 750. In FIG. 4a, depressions 725 within the composite core are formed during extrusion. These depressions 725 accommodate the strapping of fiberglass 780 material applied to the core thereafter, as in FIG. 4b, during heating of the composite core to melt the surface slightly to allow the fiberglass strapping material to adhere to the composite core, and any polypropylene in the fiberglass material to blend with polypropylene in the composite core.

Once the article of manufacture is formed, a further overlay in the form of a veil may be added for further strength and protection. A veil is a very thin film, normally less than 8 millimeters that is added to the surface of a product for protection against oxidation, discoloration, insect destruction, etc. For example, a veil can be added to the article of manufacture to increase durability. The veil may be added prior to or after the material are cut into the desired shapes. The veil can be made from polypropylene, polyethylene, or polyester materials. The weave of the veil is normally more important than the base material. A strong weave, such as polyester, is desirable if the material to be used as a printed or is a design surface. The weave or veil is applied to the surface of the product (decking board or plank) using a heating process. In other words, the surface of the product is heated up to approximately 400 degrees F. which melts the plastic surface. In the case of polyester or weave the veil is passed into the melted plastic which extrudes through the weave and makes the veil part of the surface of the product. When cooled the thermoplastic of the surface fully encompasses the veil.

In another embodiment, the veil can be co-extruded when the article of manufacture is being produced. This process requires a more complicated die system but reduces the amount of time required to produce the product.

In the case of a polyethylene or polypropylene veil, the thermoplastic in the veil melts into the thermoplastic of the product forming one homogenous layer that is not bonded. Thus the surface veil is incorporated into the surface of the product.

While the invention has been illustrated and described with respect to specific illustrative embodiments and modes of practice, it will be apparent to those skilled in the art that various modifications and improvements may be made without departing from the scope and spirit of the invention. Accordingly, the invention is not to be limited by the illustrative embodiment and modes of practice. For example, different fiber material within the scope of the invention can be substituted for the wood fiber discussed above.

What is claimed is:

1. An article of manufacture, comprising:
a core having a surface, the core comprising fiber material in an amount of about 40% to about 70% and a thermoplastic material in an amount of about 30% to about 60%; and
an overlay comprising at least one wrap comprising fiberglass strapping,
wherein the overlay contacts at least a portion of the core surface, and at least a portion of a material of the fiberglass strapping is fused with at least a portion of the material of the core.

2. The article of manufacture according to claim 1, wherein the overlay has a thickness of at least about ⅛ inches.

3. The article of manufacture according to claim 1 wherein the overlay comprises multiple wraps of fiberglass strapping.

4. The article of manufacture according to claim 1 wherein the fiberglass strapping comprises fiberglass commingled with polypropylene.

5. The article of manufacture according to claim 1 wherein the fiber material comprises fiberglass and wood fiber.

6. The article of manufacture according to claim 5 wherein the core is extruded from a mixture of fiberglass, the wood fiber and the thermoplastic.

7. The article of manufacture of claim 1 wherein the article has a modulus of elasticity exceeding 1,200,000 psi.

8. The article of manufacture according to claim 7 wherein the article has a modulus of elasticity exceeding 1,500,000 psi.

9. The article of manufacture according to claim 8 wherein the article has a modulus of elasticity exceeding 2,000,000 psi.

10. The article of manufacture according to claim 1 wherein the overlay and core further comprise polypropylene.

11. The article of manufacture according to claim 10, wherein the overlay is applied by heat and pressure sufficient to fuse the polypropylene in the core with the polypropylene in the overlay.

12. The article of manufacture according to claim 11 wherein the article has a modulus of elasticity exceeding 3,000,000 psi.

13. The article of manufacture according to claim 1, wherein the article further comprises a coloring agent and base polymer.

14. The article of manufacture according to claim 13 wherein the base polymer has a melt flow index higher than that of the thermoplastic material.

15. The article of manufacture according to claim 1 wherein the core further comprises reinforcing fiber material strands.

16. The article of manufacture according to claim 15 wherein the fiber material is fiberglass.

17. The article of manufacture according to claim 1 wherein the overlay further comprises reinforcing fiber material strands.

18. The article of manufacture according to claim 17 wherein the fiber material is fiberglass.

19. The article of manufacture according to claim 1 wherein the thermoplastic material in the core comprises polypropylene.

20. The article of manufacture according to claim 19 wherein the propylene is softened by addition of a rubber formula.

21. The article of manufacture according to claim 20 wherein the rubber formula is one of an elastomeric alloy or an elastomer compound.

22. The article of manufacture according to claim 1, wherein the core comprises one or more depressions, the one or more depressions accommodating the overlay, wherein the overlay comprises a fiberglass strapping wrap.

23. A composite material comprising:
a core having a surface, the core comprising
a wood fiber in the amount of between about 25 to 40% by weight of the core;
fiberglass in the amount of between about 25-40% by weight of the core; and
a thermoplastic in the amount of between about 20-50% of the core, and
an overlay comprising at least one wrap comprising fiberglass strapping, wherein the overlay contacts at least a portion of the core surface,. and at least a portion of the a material of the fiberglass strapping is fused with at least a portion of the material of the core.

24. The composite material of claim 23, wherein the composite material has a modulus of elasticity exceeding 800,000 psi.

25. The composite material of claim 23 wherein the composite material has a modulus of elasticity exceeding 1,200,000 psi.

26. The composite material of claim 23 wherein the composite material has a modulus of elasticity exceeding 2,000,000 psi.

27. The composite material according to claim 23, wherein the core is extruded from a mixture of fiberglass, the wood fiber and the thermoplastic.

28. The composite material according to claim 23, wherein the thermoplastic is one of polypropylene and polyethylene.

29. The composite material according to claim 23, further comprising reinforcing fiberglass strands.

30. The composite material according to claim 23, further comprising a coloring agent and a base polymer therefor.

31. The composite material according to claim 30 wherein the base polymer has a melt flow index higher than that of the thermoplastic material.

32. The composite material according to claim 23, wherein the overlay has a thickness of at least about 1/8 inches.

33. The composite material according to claim 23 wherein the overlay comprises multiple wraps of fiberglass strapping.

34. The composite material according to claim 23 wherein the thermoplastic material in the core comprises polypropylene.

35. The composite material according to claim 34 wherein the polypropylene is softened by an added elastomeric compound.

36. The composite material according to claim 34 wherein the fiberglass strapping comprises fiberglass commingled with polypropylene.

37. The composite material according to claim 23, wherein the core and the overlay both comprise polypropylene, and wherein the polypropylene in the core and the overlay is fused by applying heat and pressure.

* * * * *